United States Patent Office 3,446,060
Patented May 27, 1969

3,446,060
METHOD FOR DETERMINING ORGANIC LOADING ON CHARCOAL
David L. Venezky, Fairfax County, Va., and William B. Moniz, Clinton, Md., assignors to the United States of America as represented by the Secretary of the Navy
Filed Aug. 1, 1967, Ser. No. 657,714
Int. Cl. G01n 25/56
U.S. Cl. 73—76          10 Claims

ABSTRACT OF THE DISCLOSURE

The organic loading of sorbent material is determined by comparing the moisture loss from the sorbent material, to the moisture loss from material of known organic loading, where each is exposed to dried gas; the amount of organic loading being roughly inversely proportional to the moisture removed from the sorbent material.

BACKGROUND OF THE INVENTION

Field of the invention

This invention relates to methods of determining the organic loading on sorbent materials used for gas purification and more particularly relates to determining the organic loading on charcoal, used to purify air in a closed environment, at the site where the charcoal is used.

DESCRIPTION OF THE PRIOR ART

The atmosphere in closed environmental systems, for example, in nuclear submarines, spacecraft or undersea laboratories, requires continuous decontamination. Commonly, hydrocarbons and other organic vapors, present in the environment, are removed by sorbent materials such as activated charcoal, silica gel, molecular sieves, etc.

Activated charcoals, used in the closed environments of submarines, spacecrafts, and undersea laboratories typically sorb 20% to 30% by weight of organic material before losing their effectiveness. Presently, the cumulative amount of contaminates sorbed on activated charcoal, used in closed environmental systems, on submarines, is determined by analysis after a cruise is completed. Samples of used charcoal are usually sent to an appropriate laboratory where organic loading is determined by steam or vacuum desorption, or by nuclear magnetic resonance examination of liquid extracts. The elaborate instrumentation and technical skills required prohibit shipboard use of these methods.

During protracted cruises of nuclear submarines, activated charcoal used in air filters is typically replaced every 20 or 30 days irrespective of the degree of organic loading on the charcoal. The time interval used for charcoal replacement is not directly correlated with the amount of residual organic capacity of the sorbent material but rather is conservatively set to avoid operation with charcoal which has become substantially loaded. Consequently an accident could cause serious environmental contamination and fully load the charcoal before scheduled replacement. Conversely, charcoal containing only a few percent organic material is often discarded. A solution to the problem of maintaining clean air in a submarine, while obtaining maximum charcoal utilization, requires an onboard monitoring system which is capable of measuring the organic loading on the charcoal at the site of the submarine air purifiers.

As noted previously, existing methods for determining the organic loading on charcoal such as steam desorption, vacuum desorption, or nuclear magnetic resonance examination of liquid extracts are too complex and expensive for use in closed environmental systems. The patent to Elsey, Patent No. 2,314,201, drawn to refrigerating apparatus not charcoal, discloses a typical vacuum desorption apparatus used to remove residual moisture and hydrocarbon. The vapors removed by vacuum are condensed in a low temperature trap and the condensate collected and measured by volume. The vacuum equipment and source of refrigeration are not readily adapted for use in the confined, closed, environment of submarines, spacecraft, or undersea laboratories. In addition, the volumetric determination of water and hydrocarbon content is not sufficiently accurate for determining the organic loading on charcoal. The patent to Williams, Patent No. 2,269,569, drawn to analyzing oil core samples is not adaptable for analyzing charcoal in a confined environment. The process employs an electrical heater to first evaporate water which is collected and weighed. Oil in the core sample is then burned and expelled by heating to, for example 425° C. The method is not readily adaptable to closed environmental systems because burning of the oil would contaminate the air present in the closed environment. Wollner, Patent No. 3,144,765, is typical of closed loop analyzers used to determine the water content of material. The reference does not suggest that the apparatus be used to determine organic loading on charcoal. In the Wollner patent, a sample of wool, or the like, is placed in a sealed system and air continuously circulated through the system until substantially all the moisture in the sample has been evaporated. As in other prior art processes the air is electrically heated to aid evaporation and is condensed to collect the water. Use of an electric heater and condenser does not provide the simplicity required for use in the confined environments of submarines and the like. The volumetric determination of water content employed by Wollner does not provide the accuracy required for samples having initially low moisture contents. More importantly neither the Wollner nor Williams patents, both drawn to hot air evaporation of water, suggest that the organic loading of charcoal could be determined by simply measuring the moisture content of the charcoal.

No device or process is now known which is directed to an analyzer which employs dried gas to determine organic loading on charcoal.

SUMMARY

The method of this invention provides efficient, inexpensive, on-site determination of organic loading on charcoal without contamination of the closed environmental system and without the requirement of bulky and expensive vacuum and condensation equipment. Dried gas is passed through a sample taken from the filter system. The organic loading of the sorbent material has been found to be roughly inversely proportional to the moisture removed from the sample. The amount of water removed by the dried gas when compared to the water removed from sorbent material having known organic loading may be used to determine the organic loading of the sample being analyzed.

It is therefore an object of the present invention to provide a simple, inexpensive method for on-site determination of organic loading on sorbent material used for gas purification or other purposes where organic materials are removed in the presence of moisture or water.

Another object is to provide a method for determining the organic loading on charcoal which method requires only a source of dry gas and means for collecting and measuring the water removed.

A further object is to provide a method for determining the organic loading on charcoal used in air purifiers which method may be conducted in confined and closed environments by personnel having no special technical skills.

Still another object is to provide a method for determining organic loading on charcoal which method does not require complex and expensive vacuum or condensation equipment.

Another object of this invention is to provide a method for determining organic loading on charcoal without contaminating a closed environment.

Other objects and advantages of the invention will hereinafter become more fully apparent from the following description of the annexed drawings.

DESCRIPTION OF THE PREFERRED EMBODIMENTS

Figure 1:
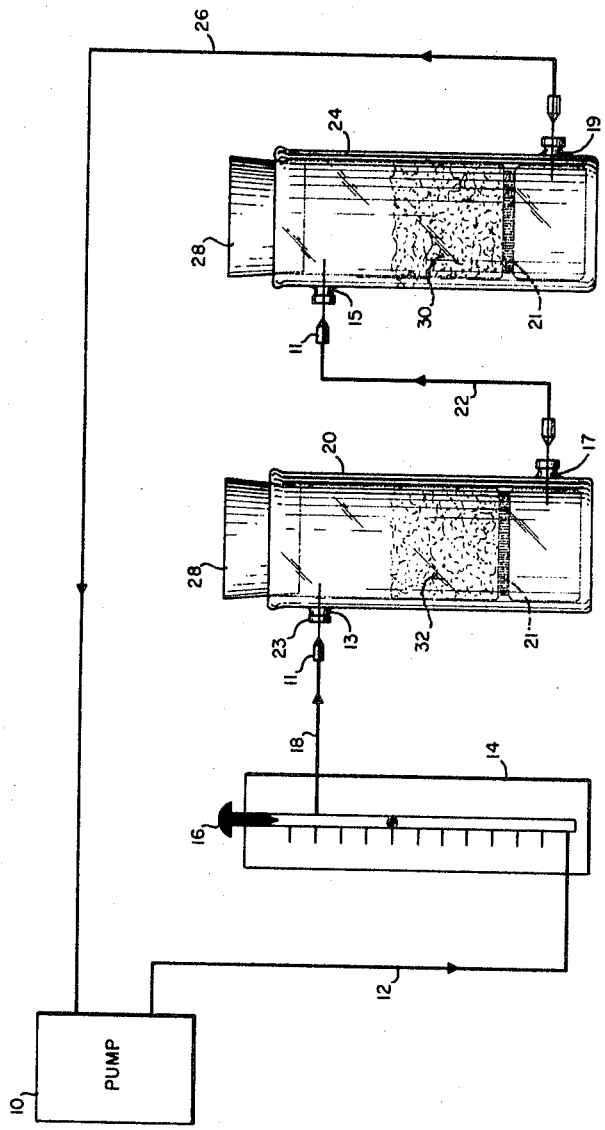
FIG. 1 is a schematic drawing illustrating a preferred embodiment of this invention.

Now referring to the drawings, there is shown by FIG. 1 a preferred apparatus for carrying out the method of this invention. The system includes a gas pump 10, which may be a diaphragm or any other suitable type, connected by line 12 to a flow meter 14. Gas pumped through line 12 to meter 14 is regulated by valve 16 which allows a controllable quantity of gas to flow through line 18 and enter the sample tube 20. The gas passing through sample tube 20, which contains the sorbent material 32 to be tested for organic loading, continues through line 22 to desiccant tube 24. Moisture removed by the gas on passing through the sorbent material 32 is collected by the desiccant material 30 placed in tube 24. Any suitable desiccant system might be employed, although it is preferred that solid material, for example anhydrous calcium sulfate (Drierite) be used. The gas passing through the desiccant-loaded tube 24 exits through line 26 which is connected to the inlet of pump 10. Dried gas entering pump 10 is recirculated.

Lines 18, 22 and 26 are shown connected to tubes 20 and 24 by small diameter sharply pointed elements 11, for example hypodermic needles through which gas will flow. The hypodermic needles are forced into the tubes 20 and 24 through inlets 13 and 15 and outlets 17 and 19 that are covered by self sealing covers such as a serum cap 23. Sample tubes 20 and 24 have a porous disc 21, or any other means for supporting solids, secured near the bottom of the tubes at a point above outlets 17 and 19. The porous disc permits gas to flow through the tubes without carrying entrained solids. Each tube is provided with a suitable stopper 28 to seal and render the tube gas and moisture tight. Lines 12, 18, 22 and 26 may be rubber or plastic tubing or for more permanent installations may be metal such as Monel or copper.

To insure accurate determination of organic loading the system shown in FIG. 1, or other embodiments, should be gas and vapor tight.

In carrying out the method of this invention, a known weight of charcoal, for which the organic loading is desired to be determined, is placed in the sample tube 20. For example about 15 ml. of charcoal weighing slightly over 8 g. may be used. Fresh desiccant, preferably previously weighed, is placed in tube 24. Stoppers are placed on both tubes and the gas lines 18, 22 and 26 connected to the tubes, as shown in FIG. 1, to form a closed, gas and vapor tight, recirculation system. The pump 10 is started and the gas flow (air) is regulated by valve 16 to a suitable flow rate, for example approximately 5 cubic feet per hour, measured by flow meter 14. The air is continuously circulated through the system for a period of time sufficient for the moisture content of the recirculated air to approach an equilibrium moisture content with the charcoal sample contained in tube 20; say, for example, 1 hour. After circulating the gas for the desired period of time the pump is turned off, lines 18, 22 and 26 are disconnected, and the sample tube 20 and desiccant tube 24 reweighed. The loss in weight of sample tube 20 and the increase in weight of the desiccant tube 24 are recorded and may be averaged to obtain the quantity of moisture transferred from the charcoal sample to the desiccant. This figure is compared to a previously determined plot of the moisture removed by dried gas for charcoal samples of known organic loading, such as that exemplified by FIG. 2. From this comparison the unknown organic loading of the charcoal sample is determined.

To insure accurate prediction of the organic loading on the charcoal the system shown in FIG. 1 must be gas and vapor tight during operation. Air or other dried gases used to remove charcoal moisture are preferably passed through the charcoal at ambient conditions, say 60° F. to 80° F., although the gas temperature may be controlled outside of that range if desired.

Figure 2:
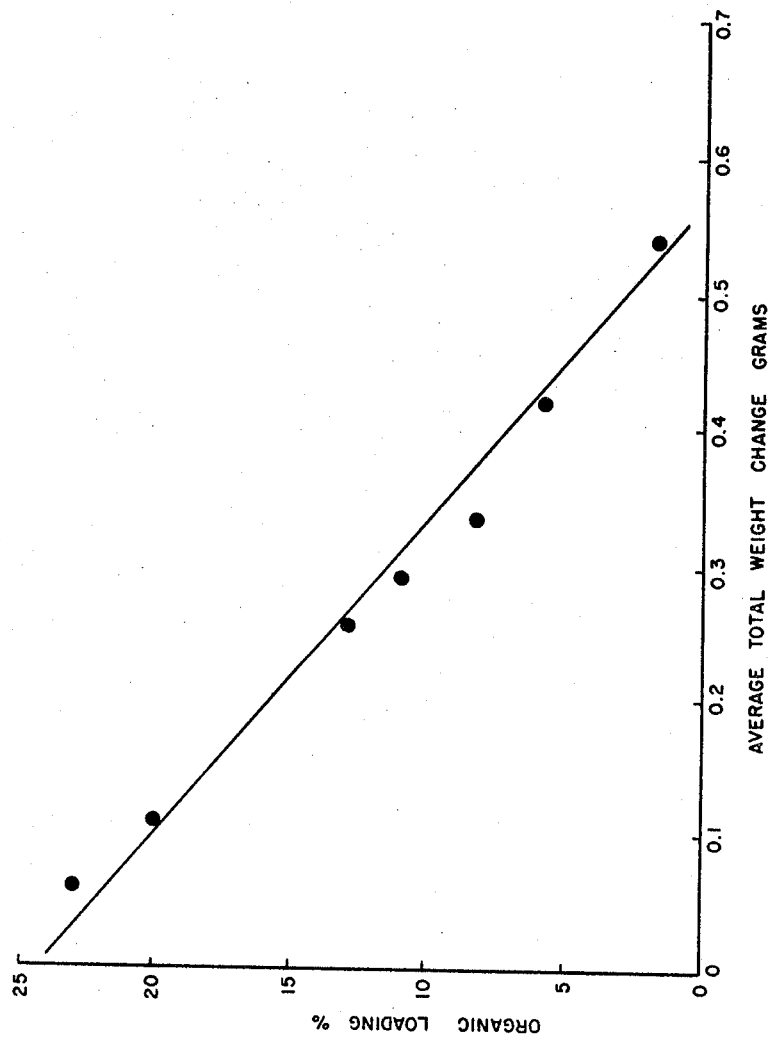
FIG. 2 is a plot illustrating that the organic loading on charcoal is roughly inversely proportional to the change in water content of the charcoal when exposed to dry gas.

An alternative method for determining the organic loading on charcoal is by controllably passing a fixed volume of dry gas through a weighed sample of charcoal taken from the air purification system. Dried gases, for example air, nitrogen, helium, argon, etc., contained in pressurized cylinders, may be employed. After a period of time sufficient for the water content of the charcoal sample to approach an equilibrium value with the water content of the dried gas, say about 1 hour for air, the charcoal sample is reweighed and the organic loading determined from a chart such as shown in FIG. 2. Although a gas flow meter is preferred, a gas source of fixed pressure with tubes and gas lines of fixed diameter may be used. The use of pressurized gas eliminates the need for a pump and desiccant source used in the embodiment illustrated in FIG. 1. While some loss in accuracy may result due to more difficult control of the system without a flowmeter, this loss is balanced by the extreme simplicity, flexibility, low cost and ease of operation of the system.

Rather than actually measure the sample and/or desiccant weight change due to exposure of the sample to dry gas, an alternative method of ascertaining organic loading on charcoal is to employ a desiccant containing a moisture sensitive dye and follow the color change of the dye to indicate when the air filter (purifier) charcoal must be replaced. For example, indicator (Drierite) desiccant contains a dye that changes color when its capacity to sorb water is exhausted. As long as a color change of a predetermined amount of this desiccant is observed the charcoal moisture content remains relatively high and therefore organic loading of the charcoal remains at a safe operating level. When the desiccant color is only partially changed or fails to change, the moisture content on the charcoal is low, a high organic loading is indicated and the spent air filter charcoal is required to be replaced with fresh material. In practice a fixed volume of charcoal and desiccant are employed; the quantity of desiccant being adjusted to fail to give a color change when the charcoal of high organic loading is analyzed.

Since color determination of organic loading does not provide a history of the quantitative change in organic loading on charcoal, but merely indicates when the purifier charcoal should be replaced, it is preferred to check purifier samples at shorter time intervals than normally employed for previously described embodiments of this invention.

In employing the processes of this invention the size of equipment, the quantity of materials, the type of dried gas, the method of supplying and regulating gas flow, the direction of gas flow, and other variables may be adjusted to conform to the requirements of the closed environment and the precision desired for determining the organic loading of charcoal.

The method of this invention is suitable for determining the organic loading on charcoal used in environments having relative humidities from about 5% to about 100% at normal temperature conditions. Since the moisture content of charcoal may vary with the humidity, accuracy in determining organic loading, is improved if the air purifiers or filters operate at constant relative humidity during air purification. For example on submarines the charcoal filters normally operate at a substantially constant relative humidity (from 50 to 60 percent relative humidity at a temperature from 70° F. to 80° F.).

Referring now to FIG. 2, there is shown the variation of organic loading on charcoal with the average total weight change of the charcoal when exposed to dry gas. It may be seen that the organic loading content is roughly inversely proportional to the change in water content of charcoal sample. The percent organic loadings on the charcoal samples analyzed and plotted on FIG. 2 were determined by steam desorption and corroborated by NMR. The average weight observed for the water transferred from the charcoal to the desiccant shows an inverse relation to the percent (by weight) of organic loading. In other words, the amount of water contained on the submarine-charcoal samples analyzed is a measure of the residual sorbent capacity of the charcoal.

Weighing errors introduced during weighing charcoal and desiccant, while practicing the method of this invention, are estimated to be within ±.01 gram for an average sample weight of 8.29 grams (15 cc. of charcoal). Of course the relative humidity of the filter environment influences to some degree the accuracy of determining organic loading. However, the effect of this condition is easily determined and suitable correction factors may be used to improve analytical accuracy.

The term of sorbent material or sorption agent as used in this specification is intended to include materials that both absorb on the surface and/or absorb by entrapment.

The method of this invention is extremely simple and reliable. Samples are analyzed on the site of the charcoal purifier by personnel not highly skilled in instrumentation techniques or chemistry. Results are available in about 1 hour. The method prevents continued use of overloaded charcoal which would lead to dangerous environmental conditions and also insures optimum use of charcoal thereby reducing cost. The inverse relationship between water content and the amount of organic loading on charcoal provides a new and extremely useful method for environmental control and monitoring in confined, closed areas such as in submarines, spacecraft, and underwater research facilities.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A process for determining the organic loading of sorbent material comprising the steps of:
   providing a sample of sorbent material at least partially loaded with organic material,
   passing a relatively dry gas through said sample for a time sufficient to approach an equilibrium moisture condition between said gas and sample,
   determining the relative quantity of organic material present on said sample by measuring the amount of water removed from said sample by said gas.

2. The invention of claim 1 wherein the amount of water removed by the gas is determined by weighing the sorbent material before and after passing gas through the sample.

3. The invention of claim 2 in which the sorbent material is charcoal.

4. The invention of claim 1 which further includes the step of passing the gas through a desiccant to collect water removed from the sample.

5. The invention of claim 4 in which a predetermined quantity of desiccant containing a moisture responsive dye is employed to allow visual indication of high organic loading on the sample and indicate the necessity for replacement of the sorbent material.

6. The invention of claim 4 in which the weight change of both the desiccant and sample is averaged to ascertain the relative organic loading on the sorbent material.

7. The invention of claim 4 in which the sample is charcoal and gas is recirculated through the charcoal.

8. The invention of claim 7 in which the gas flow is regulated and controlled to a predetermined value.

9. The invention of claim 8 in which the air is continuously recirculated through charcoal and desiccant for a predetermined period of time during which said air is isolated from the atmosphere so that no gas can enter and no water can escape or enter said recirculating air.

10. The invention of claim 9 wherein the charcoal sample is taken from an area of substantially constant relative humidity.

References Cited

UNITED STATES PATENTS

| 3,144,765 | 8/1964 | Wollner | 73—76 |
| 3,246,758 | 4/1966 | Wagner | 210—94 |
| 1,347,106 | 7/1920 | McAllister | 73—77 |

JAMES J. GILL, *Primary Examiner.*

CHARLES E. PHILLIPS, *Assistant Examiner.*

U.S. Cl. X.R.

55—19, 33